April 3, 1934. R. S. BLAIR Re. 19,131

CONSTRUCTION FOR INTERNAL COMBUSTION ENGINES

Original Filed May 9, 1919

INVENTOR

Robert S. Blair

Reissued Apr. 3, 1934

Re. 19,131

UNITED STATES PATENT OFFICE 19,131

CONSTRUCTION FOR INTERNAL COMBUSTION ENGINES

Robert S. Blair, Stamford, Conn.

Original No. 1,472,899, dated November 6, 1923, Serial No. 295,874, May 9, 1919. Application for reissue December 2, 1933, Serial No. 700,682

24 Claims. (Cl. 219—38)

This invention relates to internal combustion engines and with regard to its more specific features, to accessories therefor.

One of the objects is to provide a fuel feed system of practical and inexpensive construction, which shall be easy of application, and efficient in use.

Another object is to provide a system of the above type which shall render possible efficient starting of the engine, even under adverse weather conditions.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
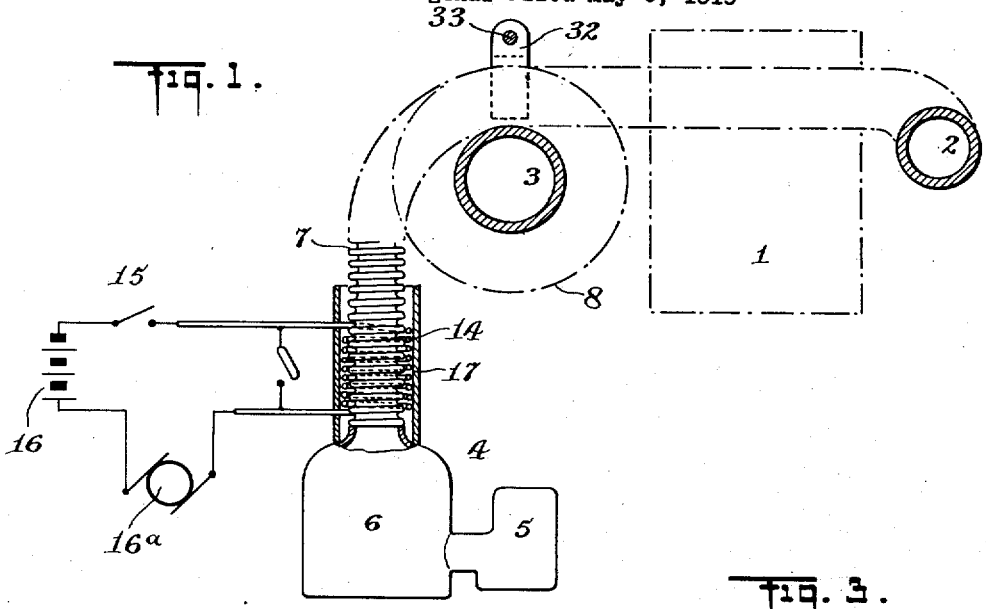
Figure 3:
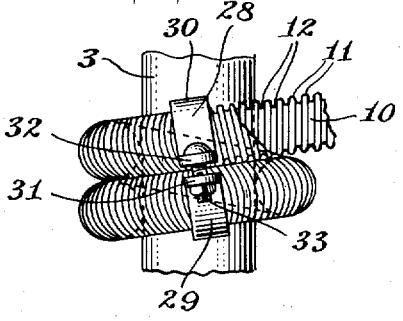
Figure 2:
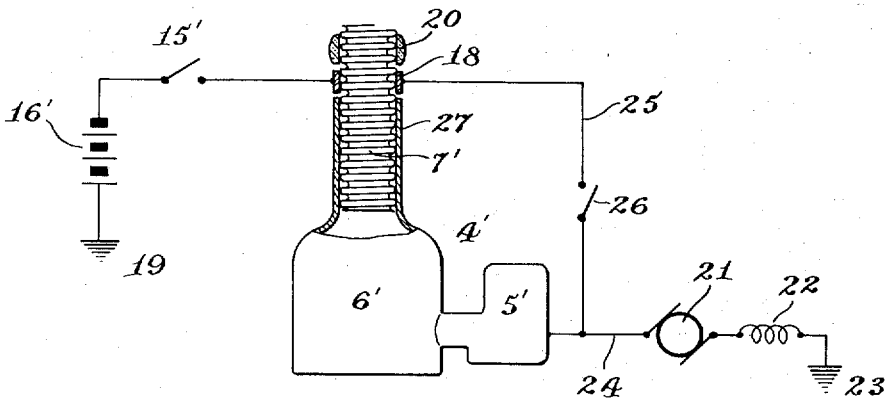

In the accompanying drawing wherein are shown one or more of various possible embodiments of the several features of this invention, Fig. 1 is a fragmentary view of an engine with my invention applied thereto;

Fig. 2 is a diagrammatic view of a modified form of my invention, shown apart from the engine; and Fig. 3 is a fragmentary plan view on an enlarged scale of the preferred mounting of fuel conduit employed.

Similar reference characters refer to similar parts throughout the different views of the drawing.

Referring now to Fig. 1 of the drawing, there is shown an internal combustion engine 1, having an intake manifold 2, and an exhaust manifold 3. Associated with this engine is any desired form of carburetor 4, having preferably a float chamber 5 and a mixing chamber 6 of any desired construction. The mixing chamber 6 is preferably connected by a flexible conduit 7 to feed the explosive mixture to the intake manifold 2. The conduit preferably has one or more turns encircling the exhaust manifold 3, as at 8, for purposes of heating the mixture while the engine is running. My conduit is preferably composed of flexible tubing.

It may briefly be noted, that the tubing is made of a single channel shaped ribbon of metal, which is helically wound as at 10, and has contiguous surfaces of the successive convolutions joined together preferably by bending and interlocking as shown at 11. This construction thus has a continuous hollow helical vane 12, communicating with the interior of the tube, and a continuous helical groove 13 on the exterior of the tube, complementing the vane 12.

Encircling the portion of tube 7, adjacent the carburetor, I provide an insulated electric heating coil 14, having its convolutions lodged in the helical groove 13. This heating coil is preferably connected by switches 15 and 15*a* to a storage battery 16. Encircling the part of the conduit 7, embraced by heating coil 14, I preferably provide a sleeve 17 of heat insulating material. Assuming the weather to be cold, with difficulty of starting the engine usually encountered, the operation proceeds substantially as follows:

Switch 15 is closed and the engine is cranked, either by hand, or preferably by an automatic starter driven from motor 16*a*. The mixture being drawn into the conduit 7, from the carburetor, it is heated by reason of energization of coil 14, which imparts its heat to the lower end of the conduit 7, and thence to the mixture.

In view of the fact that the surface of the conduit partially embraces each individual turn of the heating coil, and in view of the heat insulating covering 17, substantially all of the heat generated in coil 14, is imparted to the mixture. The hollow vane of the conduit, as is apparent, imparts a whirl to the mixture as it passes through the conduit, thus bringing about a homogeneous admixture of fuel and air, and a substantially uniform distribution of heat throughout said mixture.

The mixture having been thus treated, will then readily explode in the cylinders to cause starting.

After the engine has started under its own power, the switch 15 may be opened, and the heat from the exhaust manifold 3 will be imparted to the contents of conduit 7, particularly at the part 8 encircling said exhaust manifold. Under the latter condition, the fuel and air will be thoroughly mixed and the heat will be substantially uniformly distributed therethrough in a manner similar to the above description relating to electric preheating.

Referring now to Fig. 2, and designating parts corresponding to parts in Fig. 1, with the same reference numerals primed, I have shown a carburetor 4′, with a float chamber 5′ and a mixing chamber 6′. I connect to the mixing chamber of the carburetor, a conduit 7′ for the explosive mixture, which is preferably constructed of the same form of tubing as shown in Figs. 1 and 3, and preferably leads to the intake manifold of the engine in a manner similar to Fig. 1 (not shown in Fig. 2). If desired, I may provide the carburetor and the adjacent portion of conduit 7, with a heat insulating enclosure, as shown at 27.

Encircling the conduit 7′, I preferably provide a conducting ring 18, and I preferably connect said ring through a switch 15′ to a storage battery 16′, one of the terminals of which is preferably ground as at 19. The storage battery is preferably of the type employed in starting and lighting systems on motor vehicles. The conduit 7′ is preferably interrupted on the side of ring 18, remote from the carburetor, and the segments of said conduit are connected together by a gas-tight electric insulating union 20.

Electrically connected by one terminal 24, with the float chamber 5′, I preferably provide a starting motor 21, having a series field 22, grounded as at 23. Conductor 25 is also provided to connect the ring 18 with the terminal 24, said conductor including a manually operable switch 26.

In operation, assuming ignition and other preliminary adjustments to be made, the operator closes switch 15′. A circuit is thereupon closed from the battery 16′, through the switch 15′, to the ring 18′, through the metallic conduit 7′, through the casing of the mixing chamber and the float chamber, through the starting motor 21 and its field 22, and through ground or a metallic structure of the engine or vehicle back to the grounded terminal 19 of the battery. The resistance of the circuit just described being relatively low, the current will be relatively high, bringing about a considerable heating effect in the conduit portion 7′, below the union 20 and in the carburetor casing. This heat is imparted to the fuel and mixture. The fuel and air will be thoroughly mixed and the heat substantially uniformly distributed therethrough, by reason of the conduit construction in a manner substantially identical to that described in connection with Fig. 1 above. After the motor 21 has cranked the engine, and the same runs under its own power, switch 15′, may be opened, thus simultaneously disconnecting the battery 16′ from the carburetor and from the motor.

In the summer time when preheating of the mixture is ordinarily unnecessary, switch 26 may be closed, thus cutting conduit 7′ and the carburetor out of the electric circuit, current being led direct from ring 18, through conductor 25 to the terminal 24 of the starting motor 21.

The loop or coil of the conduit formed at 8 is clamped together at its ends as by a device 28. This device comprises a pair of jaws 29 and 30 respectively provided with flanges 31 and 32 connected as by the bolt 33. This anchors the ends of the loop or coil one to another, and prevents relative movement at such fixed points. The coil being thus tightly wound about the exhaust manifold when the parts are cold, will quickly absorb heat from the latter; but if it become excessively hot, its expansion will cause it to recede at its inner surface from the outer surface of the exhaust conduit and thus automatically regulate its own temperature. In other words, an increase of temperature expands the portion 8 of the fuel conduit relative to the manifold 3, heated from the exhaust, so as to move apart these members and their contents and reduce the heating effect on the fuel to the desired degree. Obviously when the heating effect becomes deficient the reverse action will occur to a compensating degree. Thus these actions governed by the temperature to which the parts are exposed will bring about exactly the desired regulating action.

It is to be especially noted that in the use of this apparatus not only may the gas or vapor be readily heated but the large corrugations or pockets impart to the gas traveling therein a whirling motion which greatly improves the mixture of the gas and air and presents other advantages. In other words, this turbulence and thorough stirring of the fuel insures that the heat imparted thereto is uniformly distributed therein and its action rendered uniform and efficient in all respects.

As various possible embodiments might be made of the above invention and as various changes might be made in the embodiment above set forth, it is to be understood that all matter herein set forth or shown in the accompanying drawing is to be interpreted as illustrative and not in a limiting sense.

Having thus described my invention, what I claim as new and desire to secure by Letters Patent is:—

1. In fuel treating apparatus for internal combustion engines, in combination, an internal combustion engine, means adapted to lead a complete gaseous fuel to said engine, means adapted to heat the said fuel passing to the engine by heat from the exhaust of said engine, and thermostatic means adapted to control said heating effect by altering the relative paths of said fuel and the exhaust of the engine, the controlling parts of said thermostatic means being mounted closely adjacent the exhaust of the engine to be affected by heat therefrom and acting gradually to increase or decrease said heating effect to correct deficiency or excess of its temperature.

2. In fuel-treating apparatus for internal combustion engines, in combination, an engine, a carburetor, and a conduit adapted to lead fuel from said carburetor to said engine and provided with inwardly projecting parts adapted to cause turbulence in the fuel passing therethrough, said parts being inclined with respect to the axis of the conduit.

3. In fuel-treating apparatus for internal combustion engines, in combination, a conduit positioned to lead fuel from a carburetor to an internal combustion engine and having its walls corrugated transversely to the direction of passage of fuel therethrough.

4. In fuel-treating apparatus for internal combustion engines, in combination, an engine, a carburetor and a flexible metallic conduit interposed between said carburetor and said engine.

5. In fuel-treating apparatus for internal combustion engines, in combination, an engine, means adapted to start said engine, means adapted to heat the fuel of said engine and means adapted simultaneously to actuate said starting means and to render operative said heating means.

6. In fuel-treating apparatus for internal combustion engines, in combination, a metallic conduit adapted to lead fuel to an internal combustion engine, and having its external surface grooved and a heating conductor positioned within said grooves.

7. In fuel-treating apparatus for internal combustion engines, in combination, an internal combustion engine, means adapted to lead gaseous fuel to said engine, means adapted to heat the said fuel passing to the engine by heat from the engine, and thermostatic means adapted to control the heating effect of said last means, said thermostatic means comprising a plurality of metal parts adapted to regulate in accordance with their temperature by their unequal thermal expansion.

8. In fuel-treating apparatus for internal combustion engines, in combination, an engine having an exhaust conduit, a carburetor and a flexible conduit leading from said carburetor to said engine, and passing about and substantially encircling said exhaust conduit in thermal relation thereto to derive heat therefrom.

9. In fuel-treating apparatus for internal combustion engines, in combination, an engine having an exhaust conduit, a carburetor, a flexible conduit leading from said carburetor to said engine, and passing about said exhaust conduit, and means holding in position certain portions of said flexible conduit to permit it to expand away from said exhaust conduit upon its heat becoming excessive.

10. In fuel-treating apparatus for internal combustion engines, in combination, an internal combustion engine, means adapted to lead gaseous fuel to said engine, means adapted to heat the said fuel passing to the engine by heat from the engine, and thermostatic means adapted to control the heating effect of said last means, said thermostatic means being exposed to the air in a position adjacent the exhaust from the engine to derive heat therefrom.

11. In fuel-treating apparatus for internal combustion engines, in combination, an internal combustion engine, means adapted to lead gaseous fuel to said engine, means adapted to heat the said fuel passing to the engine by heat from the engine, and thermostatic means adapted to control the heating effect of said last means, said thermostatic means comprising a part positioned outside and closely adjacent an exhaust conduit whereby it is exposed and to heat from the engine exhaust and acting to regulate the heat passing from the exhaust to the fuel to compensate for excess or deficiency of temperature of the fuel.

12. In fuel-treating apparatus for internal combustion engines, in combination, an internal combustion engine, means adapted to lead gaseous fuel to said engine, means adapted to heat the said fuel passing to the engine by heat from the engine, and thermostatic means adapted to control the heating effect of said last means.

13. In fuel-treating apparatus for internal combustion engines, in combination, an internal combustion engine, a starting motor for said engine, an electrically actuated heating device operatively related to the fuel supply of said engine, a source of current, and a device simultaneously adapted to connect said starting motor and said heating device with said source of current.

14. In fuel-treating apparatus for internal combustion engines, in combination, an internal combustion engine, a carburetor, a metallic conduit having corrugated walls leading from said carburetor to said engine and adapted by its internal corrugations to tend to cause turbulence in the fuel passing therethrough, and an electric heating conductor positioned within and insulated from the grooves formed by the external corrugations.

15. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the application of the heat, and thermostatic means adapted to control the heating effect of said last means.

16. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the application of heat, and thermostatic means adapted to control the heating effect of said last means, said thermostatic means acting gradually to increase or decrease said heating effect substantially in proportion to the deficiency or excess of temperature of its controlling member.

17. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the appplication of the heat, thermostatic means adapted to control the heating effect of said last means by varying it to compensate for excess or deficiency, and inwardly projecting parts in the path of the mixture adapted to cause turbulence in and thoroughly mix the constituents of said gaseous fuel to expose it uniformly to the heat.

18. In fuel-treating apparatus for internal combustion engines, in combination, an internal combustion engine, means adapted to lead gaseous fuel to said engine, means adapted to heat said fuel by applying heat to the complete gaseous mixture that is led into the engine without addition of air subsequent to the application of the heat, and means adapted automatically to gradually lessen said heating effect upon its becoming excessive and to gradually increase said heating effect upon its becoming deficient.

19. In fuel-treating apparatus for internal combustion engines, in combination, an internal combustion engine, means adapted to lead gaseous fuel to said engine, means adapted to heat said fuel, and means exposed to heat from the engine and to the outer air adjacent thereto adapted automatically to lessen the heating effect thereof upon its becoming excessive and to increase said heating effect upon its becoming deficient.

20. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the application of the heat, and thermostatic means adapted to control the heating effect of said last means, said thermostatic means comprising a plurality of metal parts adapted by their unequal thermal expansion to gradually increase or decrease said heating effect substantially in proportion to the deficiency or excess of temperature of its parts.

21. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the application of the heat, and thermostatic means adapted to control the heating effect of said last means, said thermostatic means comprising a member mounted outside and closely adjacent to a member heated by the exhaust and acting gradually to increase or decrease said heating effect upon the gaseous fuel substantially in proportion to the deficiency or excess of temperature of its parts.

22. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the application of the heat, thermostatic means exposed to the air adjacent the exhaust from the engine adapted to control the heating effect of said last means by varying it to compensate for excess or deficiency, and inwardly projecting parts in the path of the mixture adapted to cause turbulence in and thoroughly mix the constituents of said gaseous fuel to expose it uniformly to the heat.

23. In fuel-treating apparatus for internal combustion engines, in combination, an internal combustion engine, means adapted to lead gaseous fuel to said engine, means adapted to heat the said fuel passing to the engine by heat from the engine, thermostatic means adapted to control the heating effect of said last means, the controlling member of said thermostatic means being mounted outside and closely adjacent to the path of the exhaust of the engine to be affected by heat therefrom and exposed to the air and acting gradually to increase or decrease said heating effect to correct deficiency or excess of its temperature, and inwardly projecting parts adapted to cause turbulence in and thoroughly mix the complete constituents of said gaseous fuel to expose it uniformly to the heat.

24. In fuel-treating apparatus for internal combustion engines, in combination, an internal combustion engine, means adapted to lead gaseous fuel to said engine, means adapted to heat the fuel passing to the engine by heat from the engine, said heat being applied to the complete gaseous mixture that is led into the engine without addition of air subsequent to the application of the heat, and thermostatic means adapted to control the heating effect of said last means, said thermostatic means comprising a plurality of metal parts in position to be affected by the heat of the exhaust and the temperature of air adjacent the engine and acting by their unequal thermal expansion gradually to increase or decrease said heating effect to correct a deficiency or excess of temperature.

ROBERT S. BLAIR.